United States Patent
Anemikos et al.

(10) Patent No.: US 8,214,651 B2
(45) Date of Patent: Jul. 3, 2012

(54) RADIO FREQUENCY IDENTIFICATION (RFID) BASED AUTHENTICATION SYSTEM AND METHODOLOGY

(75) Inventors: Theodoros Anemikos, Milton, VT (US); Shawn P. Fetterolf, Cornwall, VT (US); Adam J. McPadden, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 12/169,834

(22) Filed: Jul. 9, 2008

(65) Prior Publication Data

US 2010/0011211 A1    Jan. 14, 2010

(51) Int. Cl.
  *G06F 21/00* (2006.01)
  *H04L 9/32* (2006.01)
  *H04L 9/00* (2006.01)
  *G06K 7/10* (2006.01)

(52) U.S. Cl. ............ 713/185; 713/168; 380/277; 726/5; 726/9; 726/20; 340/13.26; 235/382

(58) Field of Classification Search .................. 713/155, 713/168, 171, 183, 182, 185; 380/255, 270, 380/277, 285, 30; 726/2, 3, 21, 5, 9, 17, 726/20; 340/13.26; 235/375, 380, 382, 382.5
See application file for complete search history.

(56) References Cited

U.S. PATENT DOCUMENTS

| | | | |
|---|---|---|---|
| 6,842,106 B2 | 1/2005 | Hughes et al. | |
| 6,957,333 B2 | 10/2005 | He | |
| 7,108,177 B2 | 9/2006 | Brookner | |
| 7,245,213 B1* | 7/2007 | Esterberg et al. | 340/539.12 |
| 7,287,693 B2* | 10/2007 | Brookner | 235/382 |
| 7,461,264 B2* | 12/2008 | Chen | 713/182 |
| 7,613,927 B2* | 11/2009 | Holovacs | 713/182 |
| 7,649,440 B2* | 1/2010 | Kang et al. | 340/10.1 |
| 7,800,499 B2* | 9/2010 | Rehman | 340/572.1 |
| 2004/0083393 A1* | 4/2004 | Jordan et al. | 713/202 |

(Continued)

FOREIGN PATENT DOCUMENTS

WO    WO 2007/049072 A1    5/2007

OTHER PUBLICATIONS

Smith, et al., "Developing a Devise Adapter and Agent for the WebSphere RFID," www.ibm.com/developerworks/websphere/library/techarticles/0702_smith/0702_smith.html, Feb. 2007, 22 pages.

(Continued)

*Primary Examiner* — Zachary A Davis
(74) *Attorney, Agent, or Firm* — Gibb I.P. Law Firm, LLC

(57) ABSTRACT

Disclosed are embodiments of a radio frequency identification (RFID) authentication system and an associated authentication methodology. The embodiments incorporate an identification device (e.g., an identification badge, a key fob, etc.) with an embedded RFID tag. The embedded RFID tag is associated with a specific user and stores a private key generated as part of a public key-private key encryption scheme. The private key is read by an RFID reader and used to decode public key encrypted data stored within or accessible by a computer system (e.g., a desktop computer system, a laptop computer system, a personal digital assistant (PDA), a digital fax machine, wireless telephone, etc.). Thus, the embodiments provide a portable way to use public key-private key encryption scheme data anywhere using RFID technology.

21 Claims, 4 Drawing Sheets

U.S. PATENT DOCUMENTS

| | | | |
|---|---|---|---|
| 2006/0059367 A1* | 3/2006 | Yarvis | 713/189 |
| 2006/0136717 A1* | 6/2006 | Buer et al. | 713/155 |
| 2007/0081671 A1* | 4/2007 | Ross et al. | 380/255 |
| 2007/0106897 A1* | 5/2007 | Kulakowski | 713/171 |
| 2008/0011822 A1 | 1/2008 | Ackley et al. | |
| 2008/0024268 A1* | 1/2008 | Wong et al. | 340/5.8 |
| 2008/0170695 A1* | 7/2008 | Adler et al. | 380/277 |
| 2010/0172502 A1* | 7/2010 | Jones et al. | 380/277 |

OTHER PUBLICATIONS

"Security and Privacy Issues," E-passportseprint.iacr.org/2005/095.pdf, by Jules et al, 2005, 14 pages.

D12.3: A Holistic Privacy Framework for RFID Application: Future www.fidis.net/.../deliverables/hightechid/d123-a-holisticv-privacy-framework-for-rfid-applicaitons/doc/33/, Jun. 2008, 2 pages.

Juels, A., "RFID Security and Privacy: A research Survey," IEEE Journal on Digital Object Identifier, vol. 24, Issue 2, Feb. 2006, pp. 381-394.

Song, et al., "Privacy and Security Control Architecture for Ubiquitous RFID Healthcare System in Wireless Sensor Networks," IEEE International Conference on Digital Object Identifier, Jan. 7-11, 2006, pp. 239-240.

Fu, et al., "A New RFID-USB Key", Apr. 16-18, 2007, pp. 440-443.

* cited by examiner

RADIO FREQUENCY IDENTIFICATION (RFID) BASED AUTHENTICATION SYSTEM AND METHODOLOGY

BACKGROUND

1. Field of the Invention

The embodiments of the invention universally relate to radio frequency identification (RFID) authentication systems and methodologies and, more particularly, to an improved RFID authentication system and methodology.

2. Description of the Related Art

Due to rampant security requirements, most individuals maintain multiple, often dissimilar, passwords (i.e., passphrases, passcodes, etc.) for gaining access to secured domains. These secured domains can include, but are not limited to, secured electronic applications, folders, files, documents, programs, images, videos, web sites, web pages, faxes, emails, text messages, etc. accessible through various different types of computer systems (e.g., a desktop computer system, a laptop computer system, a personal digital assistant (PDA), a digital fax machine, wireless telephone, etc.). For many of these individuals, remembering (i.e., keeping track of) such dissimilar passwords is often difficult. Consequently, there is a need in the art for a user authentication system and method for allowing a user to gain access to secured assets without requiring the user to remember or keep track of passwords.

SUMMARY OF THE INVENTION

In view of the foregoing, disclosed herein are embodiments of a radio frequency identification (RFID) authentication system and an associated authentication methodology. The embodiments incorporate an identification device (e.g., an identification badge, a key fob, etc.) with an embedded RFID tag. The embedded RFID tag is associated with a specific user and stores a private key generated as part of a public keyprivate key encryption scheme. The private key is read by an RFID reader and used to decode public key encrypted data stored within or accessible by a computer system (e.g., a desktop computer system, a laptop computer system, a personal digital assistant (PDA), a digital fax machine, wireless telephone, etc.). Thus, the embodiments provide a portable way to use public key-private key encryption scheme data anywhere using RFID technology.

More particularly, disclosed herein are embodiments of an RFID authentication system. One embodiment of the authentication system of the present invention can comprise a RFID tag associated with a user, an RFID reader and a computer system in communication with and in control of the RFID reader. The RFID tag can comprise a first memory storing a private key and a RFID tag antenna connected to the first memory. The RFID tag antenna transmits the private key, when activated. The RFID reader can comprise a RFID reader antenna that activates the RFID tag antenna and receives the private key, as transmitted by the RFID tag antenna. The RFID reader and tag antennas can operate over a private radio frequency to avoid public access to the private key. The computer system can comprise a processor and a second memory in communication with the processor. The second memory can store encrypted data. This encrypted data can be encrypted with a public key related to the private key. The processor can access the second memory and can use the private key, as transmitted by the RFID tag antenna to the RFID reader, to decrypt the encrypted data in the second memory. That is, the private key is used by the processor to generate decrypted data. This decrypted data can comprise different types of data and can be processed by the processor in a variety of different manners.

An embodiment of an associated RFID authentication method can comprise activating an RFID tag antenna of an RFID tag associated with a user such that the RFID tag transmits a private key stored in a first memory of the RFID tag. The private key can be received and used to decrypt encrypted data, which was encrypted using a public key related to the private key and further stored locally in a second memory. This decryption process is performed in order to generate decrypted data. As mentioned with regard to the above-described authentication system embodiment, the decrypted data can comprise different types of data and can be processed in a variety of different manners.

Another embodiment of the authentication system of the present invention similarly comprises a RFID tag associated with a user, an RFID reader and a computer system in communication with and in control of the RFID reader. The RFID tag can comprise a first memory storing a private key and a RFID tag antenna connected to the first memory. The RFID tag antenna transmits the private key, when activated. The RFID reader can comprise a RFID reader antenna that activates the RFID tag antenna and receives the private key, as transmitted by the RFID tag antenna. The RFID reader and tag antennas can operate over a private radio frequency to avoid public access to the private key. The computer system can comprise a processor and a second memory in communication with the processor. The second memory can store encrypted data and in this case an encrypted password, which was encrypted with a public key related to the private key. The processor can access the second memory and use the private key, as transmitted by the RFID tag antenna to the RFID reader, to decrypt the encrypted password in the second memory. That is, the processor uses the private key to generate a decrypted password. Additionally, in this embodiment of the authentication system, the computer system comprises a user interface that further prompts the user to enter an unencrypted password. The processor can compare the unencrypted password, as entered by the user through the user interface, to the decrypted password in order to authenticate the user. Thus, this system embodiment can provide enhance enhanced security over the previously described system embodiment.

An embodiment of an associated RFID authentication method can similarly comprise activating an RFID tag antenna of an RFID tag associated with a user such that the RFID tag antenna transmits a private key stored in a first memory of the RFID tag. The private key can be received and used to decrypt encrypted data and, specifically, to decrypt an encrypted password, which was encrypted using a public key related to the private key and further stored locally in a second memory. The decryption process is performed in order to generate a decrypted password. Additionally, in this embodiment of the authentication method, after the decrypted password is generated, the user is prompted to enter an unencrypted password. Next, the unencrypted password, as entered by the user through the user interface, is compared to the decrypted password in order to authenticate the user. Thus, this method embodiment can provide enhanced security over the previously described method embodiment.

BRIEF DESCRIPTION OF THE SEVERAL VIEWS OF THE DRAWINGS

The embodiments of the invention will be better understood from the following detailed description with reference to the drawings, which are not necessarily drawn to scale and in which.

DETAILED DESCRIPTION

Figure 1:
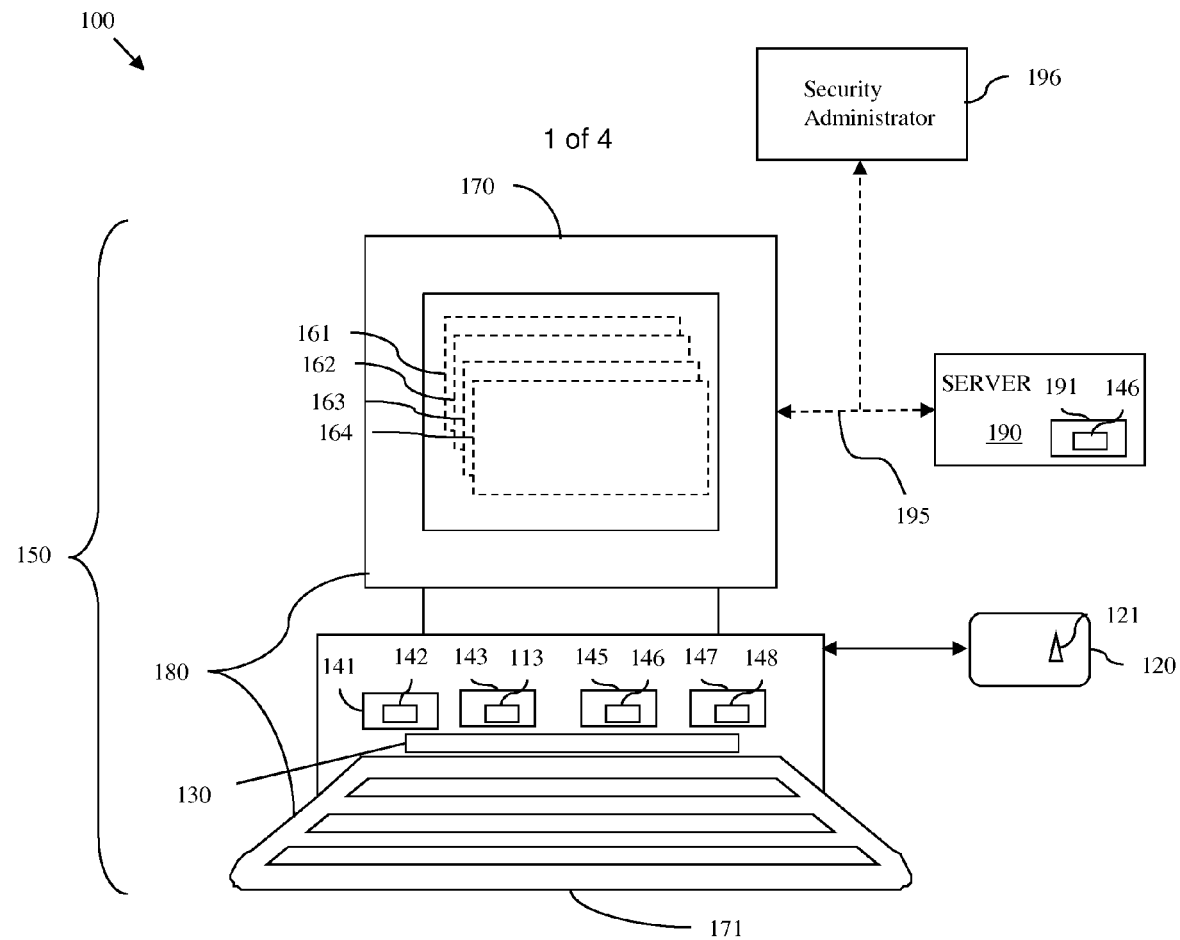
FIG. 1 is a diagram illustrating the embodiments of the user authentication system of the present invention.
Figure 1:
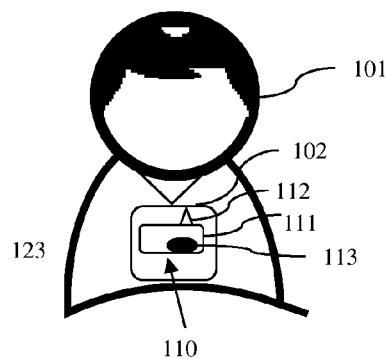

The embodiments of the invention and the various features and advantageous details thereof are explained more fully with reference to the non-limiting embodiments that are illustrated in the accompanying drawings and detailed in the following description.

As mentioned above, due to rampant security requirements, most individuals maintain multiple, often dissimilar, passwords (i.e., passphrases, passcodes, etc.) for gaining access to various secured soft and hard assets (i.e., secured electronic and physical property, respectively). Secured soft assets can comprise secured electronic applications or data, for example, electronic folders, files, documents, programs, images, videos, web sites, web pages, faxes, emails, text messages, etc. Secured hard assets can comprise, for example, secured facilities, secured areas with a secured facility, secured equipment (e.g., file cabinets, computers, etc.) within a secured area, etc. For many of these individuals, remembering (i.e., keeping track of) such dissimilar passwords is often difficult.

One conventional solution to this problem is for each individual to generate and regularly update a physical list of passwords. Another conventional solution to this problem is for each website to maintain a program, which allows a user to indicate that a password has been forgotten and which provides the user with the forgotten password (e.g., via email) in response to input information. Yet another conventional solution to this problem is a "single sign on service", which requires users to login to a locally maintained program that stores their passwords and that provides the passwords to the users, as needed and when prompted. However, such techniques require constant updating, as passwords change, expire or are added. Additionally, such techniques may not always be available. For example, physical lists may be lost or not available. Similarly, electronically stored password lists or programs may become unavailable or inoperable. Consequently, there is a need in the art for a user authentication system and method for allowing a user to gain access to secured assets (i.e., secured electronic or physical property) without requiring the user to remember or keep track of passwords.

In view of the foregoing, disclosed herein are embodiments of a radio frequency identification (RFID) authentication system and an associated authentication methodology. The embodiments incorporate an identification device (e.g., an identification badge, a key fob, etc.) with an embedded RFID tag. The embedded RFID tag is associated with a specific user and stores a private key generated as part of a public key-private key encryption scheme. The private key is read by an RFID reader and used to decode public key encrypted data stored within or accessible by a computer system (e.g., a desktop computer system, a laptop computer system, a personal digital assistant (PDA), a digital fax machine, wireless telephone, etc.). Thus, the embodiments provide a portable way to use public key-private key encryption scheme data anywhere using RFID technology.

More particularly, disclosed herein are embodiments of an RFID authentication system. Referring to FIG. 1, one embodiment of the authentication system 100 of the present invention can comprise a RFID tag 110 associated with a specific user 101, an RFID reader 120 capable of activating and reading the RFID tag 110 and a computer system 150 in communication with and in control of the RFID reader 120.

The RFID tag 110 can be embedded on an identification (ID) device 102. This ID device 102 can comprise an ID badge (as shown), a key fob, a bracelet, or any other portable device suitable for embedding an RFID tag 110. The RFID tag 110 can comprise an integrated circuit and, specifically, a first memory 111 that stores a private key 113 and a RFID tag antenna 112 connected to the first memory 111. The RFID tag antenna 112 transmits the private key 113, when activated, by the RFID reader 120.

The RFID reader 120 is controlled by the computer system 150 (e.g., by control software in the computer system 150). The RFID reader 120 can comprise a RFID reader antenna 121 that activates the RFID tag antenna 112 and receives signals therefrom. Particularly, the RFID tag antenna 112 receives the private key 113, as transmitted by the RFID antenna 112. The RFID reader antenna 121 and RFID tag antenna 112 can operate over a private radio frequency (e.g., a secured or proprietary radio frequency) to avoid public access to the private key 113.

The computer system 150 can comprise a processor 130 and a second memory 141 in communication with the processor 130. Although the computer system 150 is illustrated as a conventional desktop computer system, it should be understood that the computer system 150 of the present invention can comprise any appropriately configured computerized device, including but not limited to the following: a desktop computer system, a laptop computer system, a personal digital assistant (PDA), a digital fax machine, wireless telephone, etc. The second memory 141 can store encrypted data 142. This encrypted data 142 can be encrypted with a public key related to the private key 113. The processor 130 can access the second memory 141, retrieve the encrypted data 142 and use the private key 113, as transmitted by the RFID tag antenna 112 to the RFID reader 120, to decrypt this encrypted data 142. That is, the private key 113 is used by the processor 130 to generate decrypted data 161.

The computer system 150 does not permanently store the private key 113. Rather the computer system 150 can cause the RFID reader 120 to read the private key 113 off the RFID tag 110 in response to each request to read encrypted data. Alternatively, the computer system 150 can comprise a third memory 143 temporarily storing the private key 113, as transmitted by the RFID tag antenna 112 to the RFID reader 120, for a predetermined time period. This predetermined time period can, for example, comprise a specific amount of time or can comprise a single session (i.e., between user login on the computer system 150 and logout). The processor 130 can be in communication with the third memory 143 and can, as requested, use the private key 113 during the predetermined time period to decrypt, any other data that is encrypted with the public key and either stored within the computer system 150 (e.g., see additional data 146 in additional memory 145) or accessible by the computer system 150 via a network 195 (e.g., see additional data 146 in server memory 191 of server 190). Storing the private key 113 temporarily in the computer system 150 eliminates the need for multiple read operations by the RFID reader 120 during the predetermined time period. Upon completion of the predetermined time period (i.e., at the end of the specified time period or at log out), the private key 113 can be automatically deleted.

It should be noted that in this embodiment of the system 100, the decrypted data 161 can comprise different types of data and can be processed by the processor 130 in a variety of different manners. For example, the decrypted data 161 can comprise any type of data requested by a user, encrypted with the public key, and accessible by the computer system 150. In this case, the computer system 150 can further comprise a display 170 that displays the decrypted data 161 to the user 101.

Alternatively, the decrypted data can comprise a password (i.e., a passphrase, passcode, etc.) required for access by the user 101 to a secured domain (e.g., a secured electronic application, folder, file, document, program, image, video, web site, web page, fax, email, text message, etc.). In this case, the computer system 150 can further automatically provide the user 101 with access to the secured domain using the password (i.e., the decrypted data). For example, the computer system 150 can automatically open a secured electronic document 162 on the display 170 or can connect to a secured web site 163 on the display 170. Furthermore, if the secured domain comprises additional encrypted data (i.e., additional data encrypted using the public key), the processor 130 can further use the private key 113 to decrypt the additional encrypted data in order to generate additional decrypted data. It should be noted that, as discussed above, the computer system 150 does not permanently store the private key 113. Rather it may either not store the private key 113 at all or only temporarily store the private key 113 (e.g., in a third memory 143 for a predetermined time period). Thus, the process of decrypting additional encrypted data stored in the secured domain may require a second read of the RFID tag 110 in order to acquire the private key 113. The additional decrypted data 164 can then be displayed to the user 101 on display 170.

Figure 2:
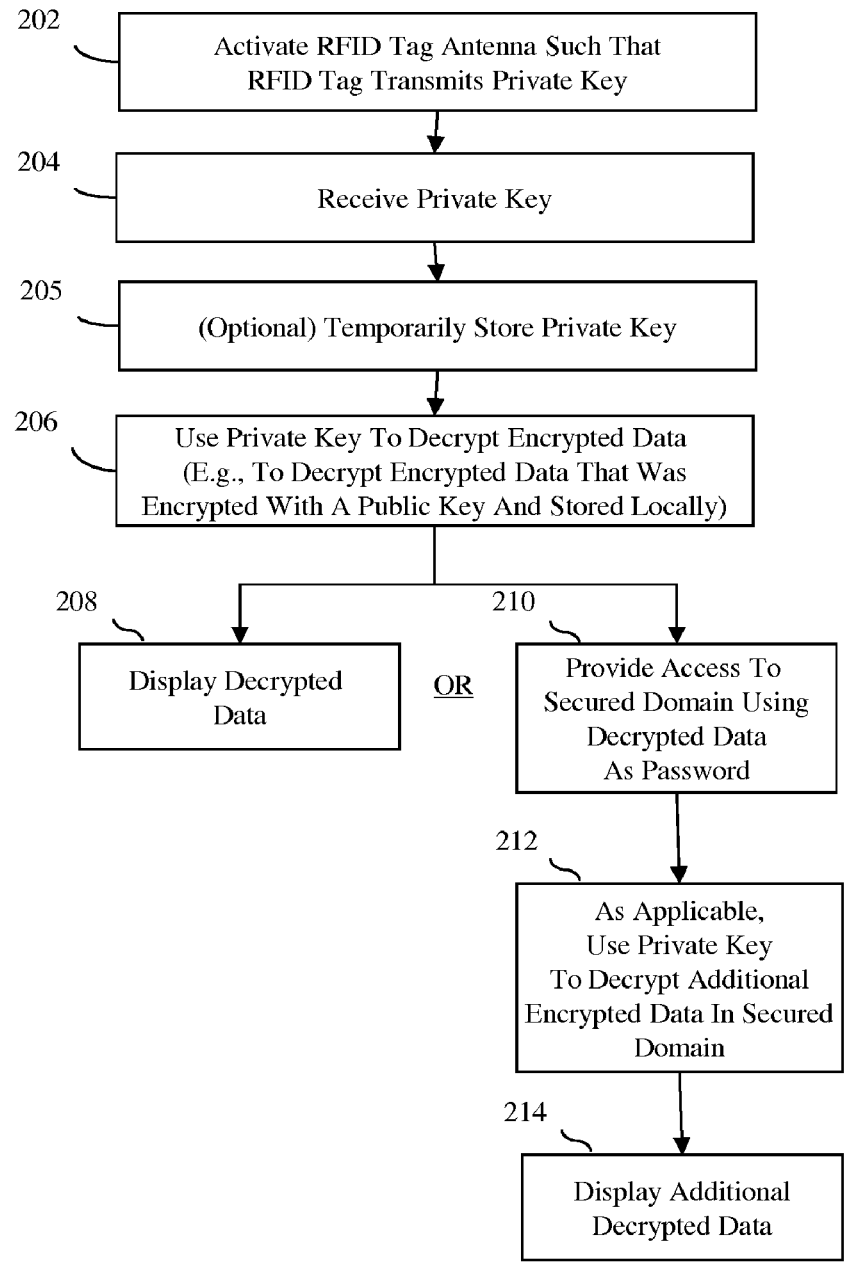
FIG. 2 is a flow diagram illustrating one embodiment of the user authentication method of the present invention.

Referring to FIG. 2 in combination with FIG. 1, an embodiment of an associated RFID authentication method can comprise, in response to a request by a user 101 to access a secured domain or to access information contained within a secured domain, activating (e.g., by an RFID reader antenna 121 of an RFID reader 120) an RFID tag antenna 112 of an RFID tag 110 associated with a user 101 such that the RFID tag 110 transmits a private key 113 stored in a first memory 111 of the RFID tag 110 (202). The private key 113 is received (e.g., by the computer system 150 via the RFID reader 120) (204). The RFID reader antenna 121 and RFID tag antenna 112 can operate over a private radio frequency (e.g., a secured or proprietary radio frequency) to avoid public access to the private key 113.

Once received, this private key 113 (as transmitted by the RFID tag antenna 112 to the RFID reader 120) can optionally be temporarily stored in a third memory 143 of the computer system 150 for a predetermined time period (205). This predetermined time period can, for example, comprise a specific amount of time or can comprise a single session (i.e., between user log in on the computer system 150 and logout). Storing the private key 113 temporarily in the computer system 150 eliminates the need for multiple read requests by the RFID reader 120 during the predetermined time period (see more detailed discussion below). Upon completion of the time period (i.e., at the end of the specified time period or at log out), the private key 113 can be automatically deleted.

The private key 113 can then be used (e.g., by a processor 130 within the computer system 150) to decrypt encrypted data 142, which was encrypted using a public key related to the private key and stored locally in a second memory 141 (206). This decryption process 206 is performed in order to generate decrypted data.

As mentioned with regard to the above-described authentication system 100 embodiment, the decrypted data can comprise different types of data and can be processed in a variety of different manners. For example, the decrypted data can comprise any type of data requested by a user, encrypted with the public key, and accessible by the computer system 150. In this case, the method can further comprise displaying the decrypted data to the user 101 (see data 161 displayed on display 170, 208).

Alternatively, the decrypted data can comprise a password (i.e., a passphrase, passcode, etc.) required for access by the user 101 to a secured domain (e.g., a secured electronic application, folder, file, document, program, image, video, web site, web page, fax, email, text message, etc.). In this case, the method further comprises automatically providing the user 101 with access to the secured domain using the password (i.e., using the decrypted data) (210). For example, the method can automatically open a secured electronic document 162 on display 170 or connect to a secured web site 163 on display 170. Furthermore, if the secured domain comprises additional encrypted data (i.e., additional data encrypted using the public key), the method can further comprise using the private key 113 to decrypt the additional encrypted data in order to generate additional decrypted data (212). It should be noted that, if the private key 113 is temporarily stored in a third memory 143 of the computer system 150 at process 205, then a subsequent read of the user's RFID tag 110 is unnecessary. However, if the private key 113 is not stored locally, then each decryption process will require a separate read of the private key 113 from the RFID tag 110. Additional decrypted data 164 can be displayed to the user 101 on display 170 (214).

Referring again to FIG. 1, another embodiment of the authentication system of the present invention provides enhanced security. Specifically, as with the previously described embodiment, this system embodiment similarly comprises a RFID tag 110 associated with a specific user 101, an RFID reader 120 capable of activating and reading the RFID tag 110 and a computer system 150 in communication with and in control of the RFID reader 120.

The RFID tag 110 can be embedded on an identification (ID) device 102. This ID device 102 can comprise an ID badge (as shown), a key fob, a bracelet, or any other portable device suitable for embedding an RFID tag 110. The RFID tag 110 can comprise an integrated circuit and, specifically, a first memory 111 that stores a private key 113 and a RFID tag antenna 112 connected to the first memory 111. The RFID tag antenna 112 transmits the private key 113, when activated, by the RFID reader 120.

The RFID reader 120 is controlled by the computer system 150 (e.g., by control software in the computer system 150). The RFID reader 120 can comprise a RFID reader antenna 121 that activates the RFID tag antenna 112 and receives RF signals therefrom. Particularly, the RFID reader antenna 121 receives the private key 113, as transmitted by the RFID tag antenna 112. The RFID reader antenna 121 and RFID tag antenna 112 can operate over a private radio frequency (e.g., a secured or proprietary radio frequency) to avoid public access to the private key 113.

The computer system 150 can comprise a processor 130 and a second memory 141 in communication with the processor 130. Although the computer system 150 is illustrated as a conventional desktop computer system, it should be understood that the computer system 150 of the present invention can comprise any computerized device, including but not limited to the following: a desktop computer system, a laptop computer system, a personal digital assistant (PDA), a digital fax machine, wireless telephone, etc. The second memory 141 can store an encrypted password 142 (i.e., an encrypted passphrase, passcode, etc.). This encrypted password 142 can be encrypted with a public key related to the private key 113. The processor 130 can access the second memory 141, retrieve the encrypted password 142 and use the private key 113, as transmitted by the RFID tag antenna 112 to the RFID reader 120, to decrypt this encrypted password 142. That is, the private key 113 is used by the processor 130 to generate a decrypted password.

The decrypted password can comprise, for example, a specific password (e.g., a specific passphrase or passcode) required for access by the user 101 to a specific secured domain (e.g., to a secured electronic application, folder, file, document, program, image, video, web site, web page, fax, email, text message, etc.). This secured domain can be either stored within (e.g., see additional memory 145, which can be secured) or accessible by (e.g., over a network) the computer system 150.

Consequently, in operation, the computer system 150 can receive a request by the user 101 for access to the secured domain or to information contained within the secured domain. The computer system 150 can then cause the RFID reader 120 to activate the RFID tag antenna 112 so that the private key 113 is transmitted. The processor 130 can then use the private key 113 to decrypt the encrypted password. Once the specific password is decrypted, the computer system 150 can use that specific password to automatically provide the user 101 with access to the requested secured domain or information contained within the secured domain. For example, the computer system 150 can use the specific password to automatically open an electronic document 162 from a stored secured domain (i.e., to display a requested secured document 162 on display 170) or to automatically connect the user to a requested secured web site 163 (i.e., to display the requested web site 163 on the display 170). As applicable, the private key 113 can further be used by the processor 130 to decrypt additional encrypted data (i.e., additional data encrypted with the public key) contained in the secured domain. It should be noted that, as discussed above, the computer system 150 does not permanently store the private key 113. Rather it may either not store the private key 113 at all or only temporarily store the private key 113 (e.g., in a third memory 143 for a predetermined time period). Thus, the process of decrypting additional encrypted data stored in the secured domain may require a second read of the RFID tag 110 in order to acquire the private key 113.

In one particular instantiation, the decrypted password can similarly comprise a password required for access by the user 101 to a secured domain. However, in this case the decrypted password can comprise a universal password and the secured domain can comprise a first secured domain stored within the computer system 150 (e.g., see additional memory 145, which can be secured) or stored within a server 190 external to the computer system 100 (e.g., see server memory 191) and accessible via a network 195. This first secured domain (e.g., additional computer system memory 145 or server memory 191) stores a database of specific passwords 146 for one or more second secured domains. Each second secured domain can be either stored within the computer system 150 (e.g., see second additional memory 147, which can be secured) or accessible by the computer system 150 (not shown).

Consequently, in operation, the computer system 150 can receive a request by the user 101 for access to the second secured domain 147 or to information (e.g., item 148 which can comprise any one or more of the following: data, a document, a file, a folder, an image, a video, a fax, an email, a text message, etc.) contained within the second secured domain 147. The computer system 150 can then cause the RFID reader 120 to activate the RFID tag antenna 112 so that the private key 113 is transmitted. The processor 130 can then use the private key 113 to decrypt the encrypted universal password 142 stored in the second memory 141 of the computer system 150. Then, once the universal password is decrypted, the computer system 150 can use that universal password to automatically provide the user 101 with access to the first secured domain 145 (i.e., the password database stored locally or on server 190) and, thereby, to the specific password 146 required for access to the second secured domain 147.

It should be noted that, if the specific password 146 in the first secured domain 145 (i.e., in the password database) is encrypted with the public key, then the processor 130 must decrypt the specific password 146 before it can be used to access to the second secured domain 147. However, as discussed above, the computer system 150 does not permanently store the private key 113. Rather it may either not store the private key 113 at all or only temporarily store the private key 113 (e.g., in a third memory 143 for a predetermined time period). Thus, the process of decrypting the specific password 146 may require a second read of the RFID tag 110 in order to acquire the private key 113. Once the specific password 146 is decrypted, it can be used by the computer system 100 to automatically provide the user with access to the second secured domain 147.

As mentioned above, this embodiment of the authentication system 100 also provides enhanced security over the previously described system embodiment. Specifically, in this embodiment, the computer system 150 comprises a user interface 180 that allows the user to interact with the computer system 150. This user interface 180 can comprise, for example, the display 170, keyboard 171, etc. The user interface 180 is specifically adapted to prompt the user 101 to enter an unencrypted password, once the encrypted password has been decrypted by the processor 130 (i.e., once the decrypted password has been generated). The processor 130 can then compare the unencrypted password, as entered by the user 101 through the user interface 180, to the decrypted password in order to authenticate the user 101. That is, if the unencrypted password and the decrypted password are the same (i.e., are identical) access to the secured domain by the user 101 can be granted. However, if the unencrypted password and the decrypted password are different, access to the secured domain only or to all domains can be denied (i.e., the user 101 can be locked out). This additional level of user authentication provides enhanced security over the previously described system embodiment.

Optionally, in the event that an authorized user is under duress (e.g., under threat of personal injury or injury to others) to enter the unencrypted password using the user interface 180 in order to allow unauthorized access to a secured domain, the authorized user may enter a different unencrypted password (i.e., a designated panic password). Such a designated panic password can be detected and recognized by the processor 130 (e.g., based on pre-loaded information). Once the designated panic password is recognized, the processor 130 would still allow access to the secured domain but would also automatically issue an alert message (e.g., via network 195) to a designated authority (e.g., security administrator 196) in order to provide assistance to the user under duress and further to protect the secured domain.

Figure 3:
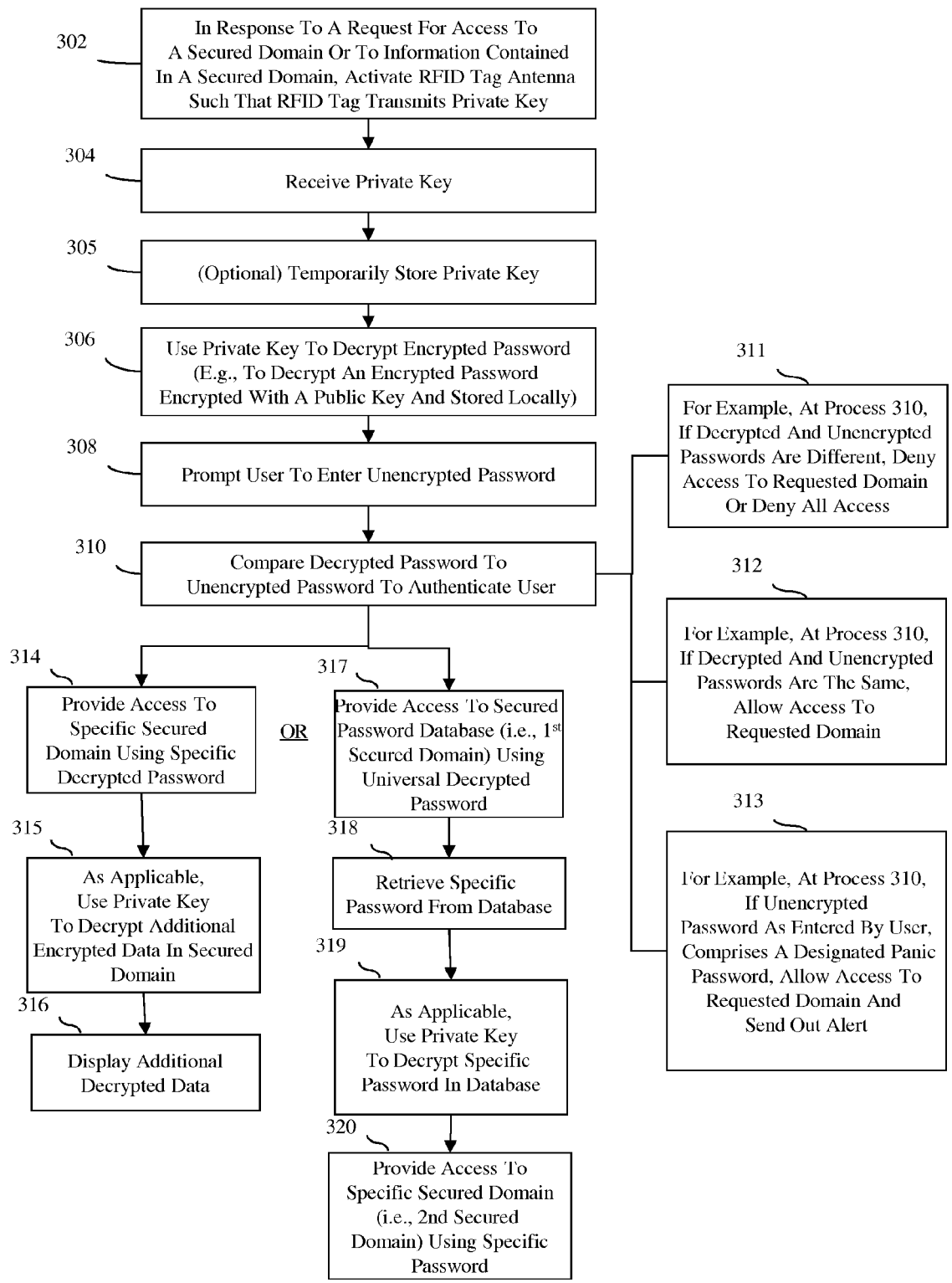
FIG. 3 is a flow diagram illustrating another embodiment of the user authentication method of the present invention.

Referring to FIG. 3 in combination with FIG. 1, an embodiment of an associated RFID authentication method similarly provides enhanced security over the previously described method embodiment. This embodiment of the method comprises, in response to a request by a user 101 to access a secured domain or to access information contained within a secured domain, activating (e.g., by an RFID reader antenna 121 of an RFID reader 120) an RFID tag antenna 112 of an RFID tag 110 associated with a user 101 such that the RFID tag 110 transmits a private key 113 stored in a first memory 111 of the RFID tag 110 (302). The private key 113 is received (e.g., by the computer system 150 via the RFID reader 120) (304). The RFID reader antenna 121 and RFID tag antenna 112 can operate over a private radio frequency (e.g., a secured or proprietary radio frequency) to avoid public access to the private key 113.

Once received, this private key 113 (as transmitted by the RFID tag antenna 112 to the RFID reader 120) can optionally be temporarily stored in a third memory 143 of the computer system 150 for a predetermined time period (305). This predetermined time period can, for example, comprise a specific amount of time or can comprise a single session (i.e., between user log in on the computer system 150 and logout). Storing the private key 113 temporarily in the computer system 150 eliminates the need for multiple read requests by the RFID reader 120 during the predetermined time period (see more detailed discussion below). Upon completion of the time period (i.e., at the end of the specified time period or at log out), the private key 113 can be automatically deleted.

The private key 113 can then be used (e.g., by a processor 130 within the computer system 150) to decrypt an encrypted password 142, which was encrypted using a public key related to the private key and stored locally in a second memory 141 (306). This decryption process 306 is performed in order to generate a decrypted password.

The enhanced security in this embodiment of the authentication method is achieved through an additional level of user authentication. Specifically, this embodiment of the authentication method can comprise, after generating the decrypted password, prompting the user 101 to enter an unencrypted password (308). Next, the unencrypted password, as entered by the user 101 through the user interface 180, is compared to the decrypted password in order to authenticate the user 101 (310). That is, if the unencrypted password and the decrypted password are the same (i.e., are identical) access to a requested secured domain by the user 101 can be granted (312). However, if the unencrypted password and the decrypted password are different, access to a requested secured domain only or to all domains can be denied (i.e., the user 101 can be locked out) (311).

Optionally, in the event that an authorized user is under duress (e.g., under threat of personal injury or injury to others) to enter the unencrypted password using the user interface 180 in order to allow unauthorized access to a secured domain, the authorized user may enter a different unencrypted password (i.e., a designated panic password). Such a designated panic password can be detected and recognized (e.g., by processor 130 based on pre-loaded information) (313). Once the designated panic password is recognized, access to the secured domain would still be allowed, but an alert message would be sent out to a designated authority (e.g., by processor 130 over network 195 to a security administrator 196) in order to provide assistance to the user under duress and further to protect the secured domain.

After the user 101 is authenticated at process 310, the decrypted password can be used to provide the user with access to secured domains or to information contained within secured domains. For example, the decrypted password can comprise a specific password (e.g., a specific passphrase or passcode) required for access by the user 101 to a specific secured domain (e.g., to a secured electronic application, folder, file, document, program, image, video, web site, web page, fax, email, text message, etc.). This secured domain can be either stored within (e.g., see additional memory 145, which can be secured) or accessible by (e.g., over a network) the computer system 150. Consequently, once the specific password is decrypted, the method can comprise using that specific password to automatically provide the user 101 with access to the requested secured domain or information contained within the secured domain (314). For example, the method can comprise using the specific password to automatically open (i.e., display) an electronic document 162 from a stored secured domain or to automatically connect the user to a requested secured web site 163 (i.e., to display the requested web site 163). As applicable, the private key 113 can be used to decrypt any additional encrypted data contained within the secured domain (315). It should be noted that, as discussed above, the process 305 of temporarily storing the private key 113 is optional. Thus, the process 315 of decrypting additional encrypted data stored in the secured domain may require a second read of the RFID tag 110 in order to acquire the private key 113. Once decrypted, the additional decrypted data can be displayed to the user (316).

In one particular instantiation, the decrypted password can similarly comprise a password required for access by the user 101 to a secured domain. However, in this case the decrypted password can comprise a universal password and the secured domain can comprise a first secured domain stored within the computer system 150 (e.g., see additional memory 145, which can be secured) or stored within a server 190 external to the computer system 150 (e.g., see server memory 191) and accessible via a network. This first secured domain (e.g., additional computer system memory 145 or server memory 191) stores a database of specific passwords 146 for one or more second secured domains. Each second secured domain can be either stored within or accessible by the computer system 150 (e.g., see second additional memory 147, which can be a second secured domain). In this case, the method further comprises receiving a request at process 302 by the user for access to the second secured domain or to information contained within the second secured domain, entering the first secured domain (i.e., the secured password database) using the decrypted universal password (317), retrieving the specific password (318), and using the specific password to provide the user with access to the second secured domain (320).

It should be noted that if the specific password as retrieved from the secured password database (i.e., from the first secured domain) is encrypted with the public key, then the method further comprises using the private key to decrypt the specific password.

Again, as discussed above, the process 305 of temporarily storing the private key 113 is optional. Thus, the process 319 of decrypting an encrypted specific password may require a second read of the RFID tag 110 in order to acquire the private key 113.

With regard to each of the above-described system and method embodiments, those skilled in the art will recognize that in conventional public key-private key cryptography two related keys (i.e., a public key and a private key) are generated mathematically. Information that is encrypted with a public key can only be read (i.e., decrypted) with the related private key. Generally, such keys are used as follows. A first user will generate both the public key and the related private key. The first user will disseminate the public key and keep the private key private. A second user will use the public key to encrypt data (e.g., a message) and will transmit the encrypted data to the first user. The first user will then decrypt the message using the private key, which is stored on the first user's password protected computer. Thus, as mentioned above, the present system 100 and method embodiments differ from conventional public key-private key cryptography in that the private key 113 is transmitted over a private radio frequency from an RFID tag 110 of the user 101 through the reader 120 to any appropriately configured computer system 150, where it is then used to decrypt data. By providing a means to transmit the private key by RFID, as needed, the present invention provides a very portable way of using private key-public key encryption scheme data anywhere.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
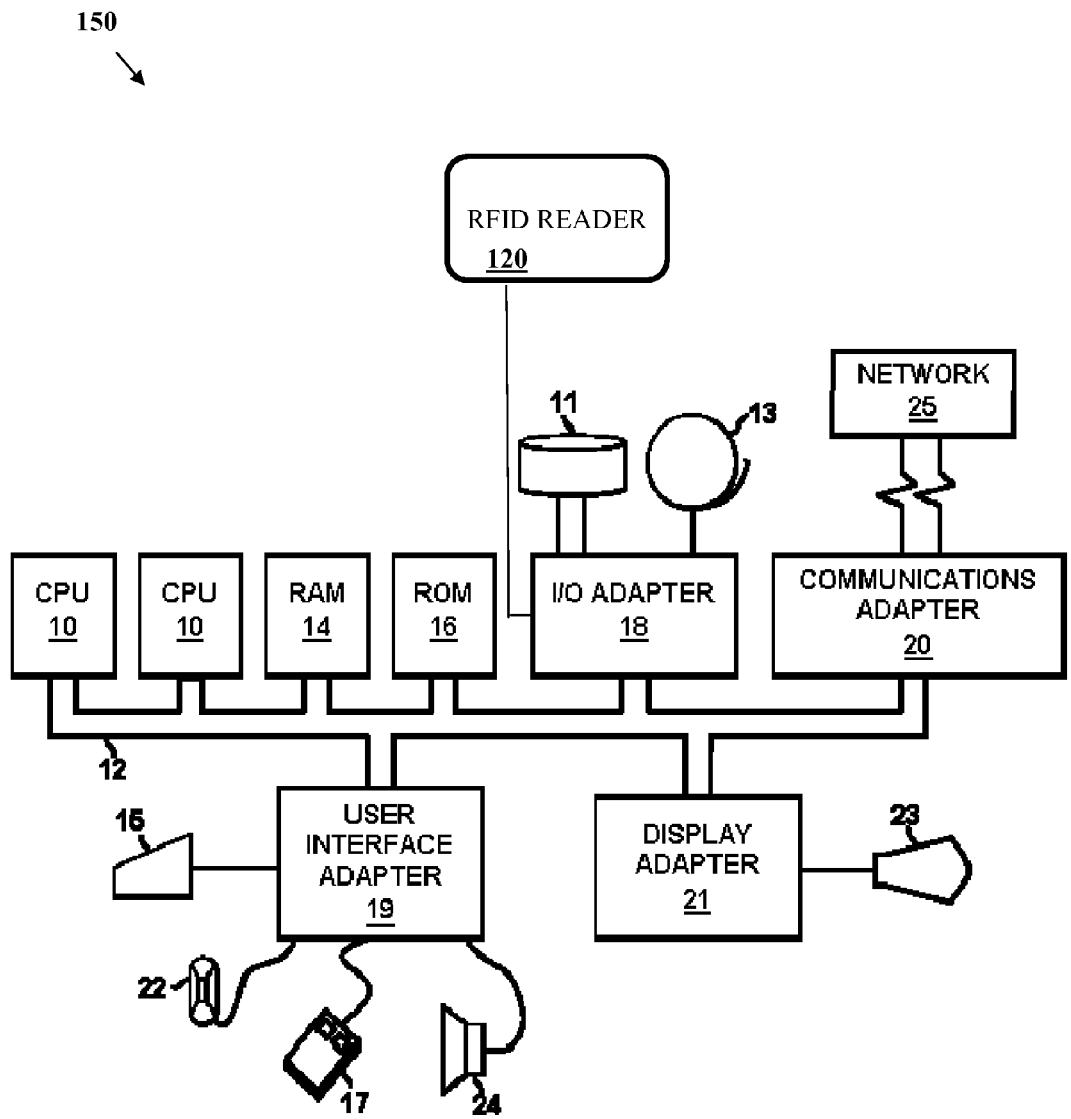
FIG. 4 is a schematic diagram illustrating an exemplary hardware environment that can be used to implement the embodiments of the invention.

A representative computer system 150 for practicing the embodiments of the invention is depicted in FIG. 4. This schematic drawing illustrates a hardware configuration of an information handling/computer system 150 in accordance with the embodiments of the invention. The system 150 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as the RFID reader 120, disk units 11, tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

Therefore, disclosed above are embodiments of a radio frequency identification (RFID) authentication system and an associated authentication methodology. The embodiments incorporate an identification device (e.g., an identification badge, a key fob, etc.) with an embedded RFID tag. The embedded RFID tag is associated with a specific user and stores a private key generated as part of a public key-private key encryption scheme. The private key is read by an RFID reader and used to decode public key encrypted data stored within or accessible by a computer system (e.g., a desktop computer system, a laptop computer system, a personal digital assistant (PDA), a digital fax machine, wireless telephone, etc.). Thus, the embodiments provide a portable way to use public key-private key encryption scheme data anywhere using RFID technology.

What is claimed is:
1. A radio frequency identification (RFID) authentication system comprising:
    a RFID tag associated with a user, said RFID tag comprising a first memory storing a private key and a RFID tag antenna connected to said first memory, said RFID tag antenna transmitting said private key, when activated;

a RFID reader comprising a RFID reader antenna activating said RFID tag antenna and receiving said private key; and a computer system in communication with said RFID reader, said computer system comprising:
a processor; and
a second memory accessible by said processor, said second memory storing encrypted data, said encrypted data being encrypted with a public key related to said private key, said processor further using said private key, as transmitted by said RFID tag antenna of said RFID tag to said RFID reader antenna of said RFID reader, to decrypt said encrypted data in order to generate decrypted data, said decrypted data comprising a password required for access by said user to a secured domain, and said computer system further automatically providing said user with access to said secured domain using said password.

2. The radio frequency identification (RFID) authentication system according to claim 1, said computer system further comprising a display displaying said decrypted data to said user.

3. The radio frequency identification (RFID) authentication system according to claim 1, said secured domain comprising additional encrypted data encrypted using said public key and said processor further using said private key to decrypt said additional encrypted data in order to generate additional decrypted data.

4. The radio frequency identification (RFID) authentication system according to claim 3, said computer system further comprising a display displaying said additional decrypted data to said user.

5. The radio frequency identification (RFID) authentication system according to claim 1, said RFID tag antenna further operating over a private radio frequency.

6. The radio frequency identification (RFID) authentication system according to claim 1, said computer system further comprising a third memory temporarily storing said private key, as transmitted by said RFID tag antenna to said RFID reader, for a predetermined time period.

7. A radio frequency identification (RFID) authentication method comprising:
activating an RFID tag antenna of an RFID tag associated with a user such that said RFID tag antenna of said RFID tag transmits a private key stored in a first memory of said RFID tag;
receiving, by an RFID antenna of an RFID reader, said private key; and
using, by a computer system in communication with said RFID reader, said private key to decrypt encrypted data in order to generate decrypted data, said encrypted data being encrypted using a public key related to said private key and further being stored in a second memory accessible by said computer system, said decrypted data comprising a password required for access by said user to a secured domain; and
automatically providing, by said computer system, said user with access to said secured domain using said password.

8. The radio frequency identification (RFID) authentication method according to claim 7, further comprising displaying said decrypted data to said user.

9. The radio frequency identification (RFID) authentication method according to claim 7, said secured domain comprising additional encrypted data, said additional encrypted data being encrypted using said public key and said method further comprising using said private key to decrypt said additional encrypted data in order to generate additional decrypted data.

10. The radio frequency identification (RFID) authentication method according to claim 9, further comprising displaying said additional decrypted data to said user.

11. The radio frequency identification (RFID) authentication method according to claim 7, said RFID tag antenna further operating over a private radio frequency.

12. The radio frequency identification (RFID) authentication method according to claim 7, further comprising temporarily storing said private key, as transmitted by said RFID tag antenna to said RFID reader, in a third memory for a predetermined time period.

13. A radio frequency identification (RFID) authentication system comprising:
a RFID tag associated with a user, said RFID tag comprising a first memory storing a private key and a RFID tag antenna connected to said first memory, said RFID tag antenna transmitting said private key over a private radio frequency, when activated;

a RFID reader comprising a RFID reader antenna activating said RFID tag antenna and receiving said private key; and a computer system in communication with said RFID reader, said computer system comprising:
a processor;
a second memory accessible by said processor, said second memory storing an encrypted password, said encrypted password being encrypted with a public key related to said private key, and said processor further using said private key, as transmitted by said RFID tag antenna to said RFID reader, to decrypt said encrypted password in order to generate a decrypted password; and
a user interface in communication with said processor, said user interface prompting said user to enter an unencrypted password and said processor further comparing said unencrypted password, as entered by said user through said user interface, to said decrypted password in order to authenticate said user, said decrypted password being a specific password required for access by said user to a secured domain and said computer system further receiving a request by said user for access to said secured domain and, once said user is authenticated, automatically providing said user with access to said secured domain using said specific password.

14. The radio frequency identification (RFID) authentication system according to claim 13, said decrypted password comprising a universal password required for access by said user to a first secured domain storing a specific password required for access by said user to a second secured domain and said computer system further receiving a request by said user for access to said second secured domain, entering said first secured domain using said universal password, retrieving said specific password, and using said specific password to provide said user with access to said second secured domain.

15. The radio frequency identification (RFID) authentication system according to claim 14, said specific password being encrypted with said public key and said processor further using said private key to decrypt said specific password.

16. The radio frequency identification (RFID) authentication system according to claim 13, said processor further recognizing that said unencrypted password, as entered by said user through said user interface, comprises a designated panic password and automatically alerting a designated authority that said designated panic password has been entered.

17. The radio frequency identification (RFID) authentication system according to claim 14, said computer system further comprising a third memory temporarily storing said private key, as transmitted by said RFID tag antenna to said RFID reader, for a predetermined time period.

18. A radio frequency identification (RFID) authentication method comprising:
   activating an RFID tag antenna of an RFID tag associated with a user such that said RFID tag antenna of said RFID tag transmits, over a private radio frequency, a private key stored in a first memory of said RFID tag;
   receiving, by an RFID reader antenna of an RFID reader, said private key;
   using, by a computer system in communication with said RFID reader, said private key to decrypt an encrypted password in order to generate a decrypted password, said encrypted password being encrypted using a public key related to said private key and being stored in a second memory accessible by said computer system;
   prompting, by said computer system, said user to enter an unencrypted password; and
   comparing, by said computer system, said unencrypted password, as entered by said user, to said decrypted password in order to authenticate said user, said decrypted password being a specific password required for access by said user to a secured domain and said method further comprising receiving a request by said user for access to said secured domain and, once said user is authenticated, automatically providing said user with access to said secured domain using said specific password.

19. The radio frequency identification (RFID) authentication method according to claim 18, said decrypted password comprising a universal password required for access by said user to a first secured domain storing a specific password required for access by said user to a second secured domain and said method further comprising receiving a request by said user for access to said second secured domain, entering said first secured domain using said universal password, retrieving said specific password, and using said specific password to provide said user with access to said second secured domain.

20. The radio frequency identification (RFID) authentication method according to claim 19, said specific password being encrypted with said public key and said method further comprising using said private key to decrypt said specific password.

21. The radio frequency identification (RFID) authentication method according to claim 18, further comprising recognizing that said unencrypted password, as entered by said user through said user interface, comprises a designated panic password and automatically alerting a designated authority that said designated panic password has been entered.

\* \* \* \* \*